Sept. 1, 1931. L. A. HYLAND 1,821,262
POWER SUPPLY FOR THERMIONIC TUBES
Filed March 9, 1929
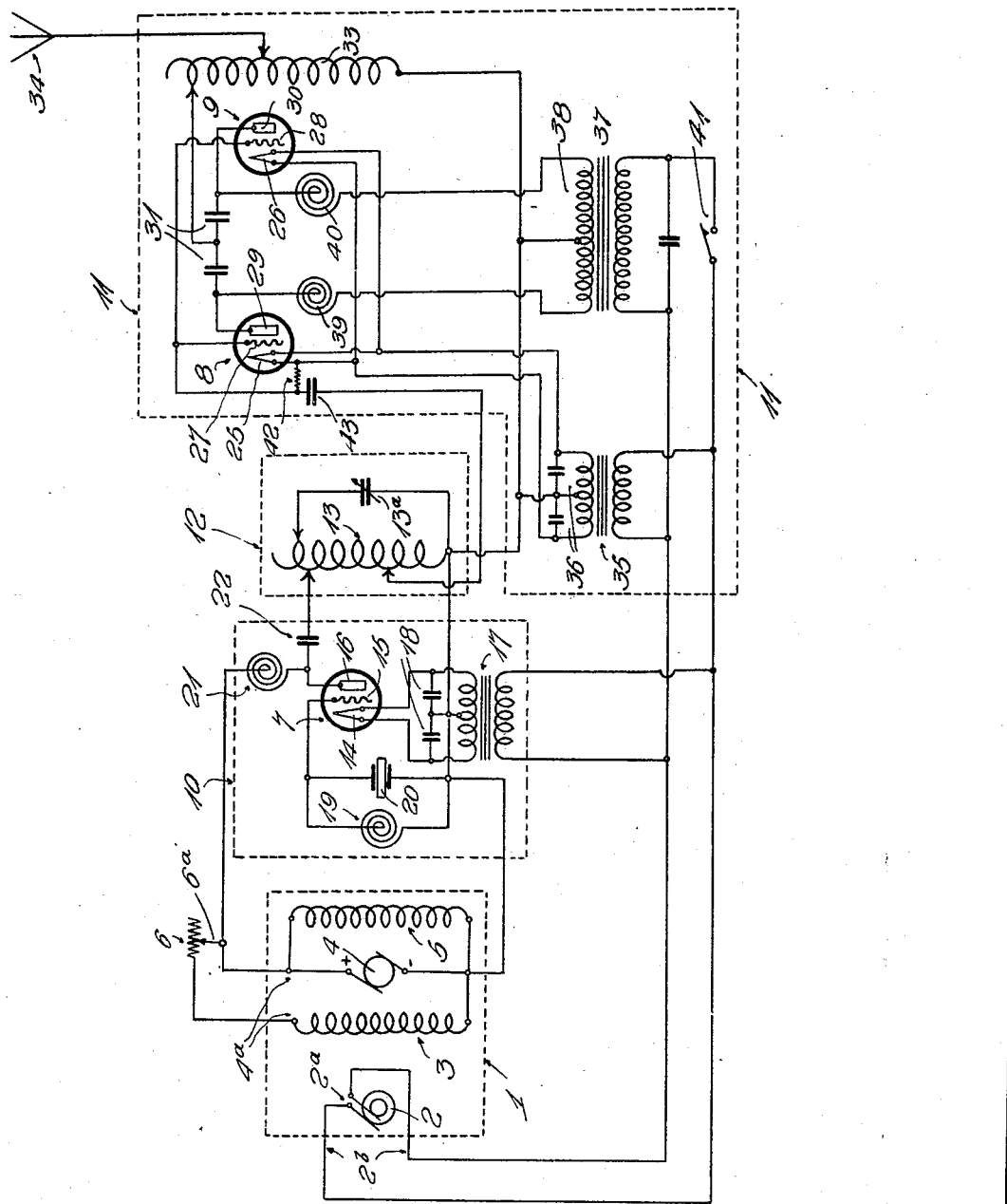
INVENTOR.
Lawrence A. Hyland,
BY Harold Dodd
ATTORNEY.

Patented Sept. 1, 1931

1,821,262

UNITED STATES PATENT OFFICE

LAWRENCE A. HYLAND, OF WASHINGTON, DISTRICT OF COLUMBIA, ASSIGNOR TO WIRED RADIO, INC., OF NEW YORK, N. Y., A CORPORATION OF DELAWARE

POWER SUPPLY FOR THERMIONIC TUBES

Application filed March 9, 1929. Serial No. 345,865.

My invention relates broadly to power supply systems for energizing thermionic tubes.

One of the objects of my invention is to provide a system for supplying the necessary energizing potential for the electrodes of thermionic tubes.

Another object of my invention is to provide a power supply unit of small weight and of small dimensions suitable for aeronautical signaling systems.

A further object of my invention is to provide a complete power supply unit adapted to energize the electrodes of thermionic tubes employed in both radio transmitters and receivers.

A still further object of my invention is to provide a compact power unit adapted to energize the cathode circuits with alternating current and the anode circuits with a direct current.

A better understanding of my invention can be had from the specification hereinafter following by reference to the accompanying drawing which is a schematic circuit diagram showing the power supply for thermionic tubes of my invention.

When thermionic tubes are employed in certain circuit arrangements functioning as detectors, amplifiers and the like, it is frequently desirable if not necessary to supply the anode circuits with a source of continuous or direct current. The cathode circuit may be energized from alternating current when the design of the tubes or the circuit arrangement is proper. Alternating current is frequently applied to the anodes of thermionic tubes employed as amplifiers in a radio transmitter. In such transmitters it is not infrequently desirable to energize the cathode circuits with alternating current. In radio receiving circuits it is desirable and generally necessary to supply the anode circuits with direct current. For efficient operation of signaling systems employed in aeronautical practice, unnecessarily heavy and bulky sources of power supply are not suitable. The power supply for thermionic tubes of my invention finds ready application where weight and space are essential considerations and while especially adapted to signaling systems employed in airplanes, it is not confined to such use. In military engagements or exploring expeditions the power supply for thermionic tubes of my invention may be employed to great advantage.

The accompanying drawing is a schematic circuit diagram depicting a high frequency transmitter wherein the thermionic tubes are energized by the power supply unit of my invention. A schematic and representative arrangement of the alternator employed is shown as contained in a metallic frame 1 which adequately shields the same from stray electrostatic fields. The alternator may be actuated by a propeller attached to the armature shaft whereby the resistance to the air effects the proper rotation or the alternator may be in direct mechanical relation with the airplane motor directly. The alternator may be any suitable type depending upon the particular application. The alternator 1 in its entirety comprises an armature 2 having commutator rings and brushes 2a. The alternator field circuit comprises a winding 3 which is excited by a source of direct current from exciter 4, 5. The armature 4 of the exciter is shown connected in parallel with the field winding 5 of the exciter. Exciter 4, 5 is connected in parallel with field winding 5 of alternator 1 through rheostat 6. Thermionic tubes 7 and 8, 9 are associated with oscillatory and amplifying circuit arrangements. Thermionic tube 7 is shown as comprising a cathode 14, control electrode 15 and anode 16. A shield grid or shield anode type of tube may be employed. The oscillatory tube 7 and associated oscillatory circuits comprise the master generator unit 10. Amplifying tubes 8 and 9 and their associated circuits comprise amplifier unit 11. Thermionic tubes 8 and 9 comprise cathodes 25—26, control electrodes 27—28 and anodes 29—30, respectively.

The output circuit of thermionic tube 7 comprises inductance 13 and capacity 13a contained within a shielding compartment 12. The input circuit of thermionic tube 7 incomprises high frequency choke coil 19 and mechanically vibratile element 20. Mechanically vibratile element 20 may be a piezo electric crystal. Anode 16 of thermionic tube 7 is coupled to output circuit 12 by capacity element 22. The cathode circuit of thermionic tube 7 is energized from transformer 17. Capacities 18 are connected in parallel with the secondary winding of transformer 17 and serve as a by-pass for high frequency energy. Anode 16 of thermionic tube 7 is energized from exciter circuit 4, 5 of alternator 1, high frequency choke coil 21 serving to prevent high frequency energy from reaching exciter 4, 5. The negative terminal of exciter 4, 5 is connected to the common cathode connection of tubes 7, 8 and 9. The positive terminal of exciter 4, 5 is connected to the movable arm 6a of rheostat 6 which establishes a parallel connection with field winding 3 of the alternator proper. Thermionic tubes 8 and 9 are adapted to amplify the energy from output circuit 12. The output circuit of thermionic tubes 8 and 9 includes capacities 31 and inductance 33. Load circuit 34 is connected with inductance 33, the former comprising a space radio radiating system as shown or physical circuits as employed in wired radio systems. Anode 29 of thermionic tube 8 is connected to one side of secondary winding 38 of transformer 37 through high frequency choke coil 39. Anode 30 of thermionic tube 9 is connected to the other side of winding 38 of transformer 37 through high frequency choke coil 40.

Control electrodes 27 and 28 of thermionic tubes 8 and 9 respectively, are connected in common with resistance 42 which resistance completes the control electrode return circuit to the common cathode connection. Capacity 43 is connected in series with control electrodes 27 and 28 of thermionic tubes 8 and 9 respectively, and a portion of high frequency inductance 13. The primary windings of transformers 17, 35 and 37 are connected in common with the output of alternator 1 by means of connecting leads 2b to brushes 2a. Brushes 2a bear against the collecting rings or commutating rings connected with the winding of armature 2. Telegraph key 41 is connected in series with the primary winding of transformer 37. The electrical centers of the secondary windings of transformers 17, 35 and 37 are connected in common, which connection constitutes the common cathode connection of units 10 and 11.

It is not difficult to understand the operation and appreciate the advantages of the power supply for thermionic tubes of my invention. Exciter 4, 5 is actuated which causes a potential difference of direct current across the terminals 4a. This causes the supply of potential to anode 16 of thermionic tube 7, anode 16 being supplied with a potential of positive polarity with respect to the polarity of cathode 14. Field winding 3 of alternator 1 is simultaneously energized whereby the necessary magnetic field is obtained. The winding of armature 2 cuts these lines of force and a potential is developed at brushes 2a.

The potential from brushes 2a being alternating in nature, is connected to the primary winding of transformer 17. The secondary winding of transformer 17 delivers the necessary energizing potential to cathode 14. The primary winding of transformer 35 is in like manner energized and the secondary winding supplies the energizing potential to cathodes 25 and 26 of thermionic tubes 8 and 9, respectively. Key 41 may now be closed which closing completes the circuit energizing the primary winding of transformer 37. The secondary winding is provided with a connection from its electrical center with the common cathode connection of thermionic tubes 8 and 9. The ends of the secondary winding of transformer 37 are connected to anodes 29 and 30, of thermionic tubes 8 and 9 respectively, which arrangement causes the polarity of the potential impressed upon the anodes to alternate through positive and negative values, and in a manner well known to those skilled in the art, thermionic tubes 8 and 9 alternately function to amplify the energy from circuit 13, 13a. Key 41 is employed to effect character formation of the transmitted energy, however, any suitable modulating means may be employed. Rheostat 6 controls the relative excitation of field winding 3 and the potential supplied anode 16. An independent rheostat may be inserted in series with arm 6a of rheostat 6 and choke coil 21, thereby providing regulation of the potential supplied anode 16 irrespective of the current in the field winding 3. The windings of armature 4 and field 5 may be combined in many ways. Winding 5 may be dispensed with, winding 3 serving also as the field winding for excitation energy. The commutator of armature 4 may be driven in common with the shaft of the alternator armature.

Many modifications of my invention are possible. Many designs of the alternator may be employed adapted to the application desired. Any type of thermionic tubes may be energized by such arrangements whereby the cathode circuits of such tubes are energized by the alternating current from the generator and the anodes energized by the direct current from the field circuit of such generator. The power supply for thermionic tubes of my invention is well adapted to application in portable amplifiers, transmitters or receivers. Receiving sets employing thermionic tubes having cathodes of the indirect heater type may be employed. Suitable filter circuits comprising inductance and capacity may be employed in the anode supply circuit where the noise from commutation is objectionable. The power supply system for thermionic tubes of my invention eliminates the necessity of employing batteries or individual sources of energy for the several circuits to be energized. In aeronautical work the power supply system finds ready application to the energization of landing lights, radio beacon systems and the like.

It is to be strictly understood that the embodiments of my invention are not in any way to be restricted by the foregoing specification or by the accompanying drawing but only by the scope of the appended claims.

What I claim as new and desire to secure by Letters Patent of the United States is as follows:

1. In a power supply system for energizing thermionic tubes the combination of an alternator having its field excitation circuit in common with the anode energizing circuit of said tubes, said alternator being connected for energizing the cathodes of said tubes.

2. A power supply system for thermionic tubes wherein the anode circuits of said tubes are energized by the field excitation energy of an alternator, said alternator being connected for energizing the cathodes of said tubes.

3. A power supply for thermionic tubes wherein the anodes of said tubes are energized in common with the energization of a field circuit of an alternator, said alternator being connected for energizing the cathodes of said tubes.

4. A power supply for energizing the cathodes and anodes of thermionic tubes comprising in combination an alternator having its alternating current output connected for energizing the cathodes of said tubes and its field circuit in common with the anode circuits of said tubes.

5. A power supply system for energizing thermionic tubes comprising in combination an alternator connected for energizing the cathodes of said tubes and an exciter connected for energizing the field circuit of said alternator in common with the anodes of said tubes.

6. A power supply system for energizing the electrodes of thermionic tubes comprising in combination an alternator having a field winding energized by a source of direct current and the anodes of said thermionic tubes being energized in common with said field winding, said alternator being connected for energizing the cathode of said tube.

7. A power supply system for energizing thermionic tubes comprising in combination an alternator connected for energizing the cathodes of said tubes, said alternator having a field winding energized by a source of direct current, and the anodes of said tubes being energized by the same source of energizing potential as said field winding.

8. A power supply for energizing thermionic tubes employed in high frequency signaling systems comprising in combination an alternating current generator connected for energizing the cathodes of said tubes, said generator having a field winding energized by a source of direct current and the anodes of said tubes being energized by said source of energy for energizing said field winding.

9. A power supply for energizing the electrodes of thermionic tubes employed in high frequency signaling systems comprising an alternating current generator for energizing the cathodes of said tubes, said generator having a field winding energized by an exciter circuit and the anodes of said tubes being energized in common with said field winding by the energy from said exciter circuit.

10. A power supply system for energizing the electrodes of thermionic tubes comprising in combination an alternating current generator for energizing the cathodes of said tubes, said generator having a field winding energized by an exciter circuit and the anodes of said tubes energized in common with said field winding by the energy from said exciter circuit.

11. A power supply system for thermionic tubes comprising in combination an alternating current generator for energizing electrodes of said tubes, said alternating current generator being excited by direct current, certain of the electrodes of said thermionic tubes being energized by alternating current, and certain other of said tubes being energized by the direct current excitation of the field circuit of said generator.

12. In signaling systems employing thermionic tubes an alternating current generator having a field winding excited by a source of direct current, said alternating current generator being connected for energizing the cathodes of said thermionic tubes, said source of direct current being employed to energize the anode circuits of said tubes.

13. In a radio transmitting system, an electron tube oscillator having cathode, anode and grid electrodes, an alternating current generator connected for energizing said cathode electrodes, a source of direct current for exciting the field of said alternating current generator, and a piezo electric crystal connected in the grid circuit of said electron tube oscillator for controlling the frequency thereof, said anode electrodes being energized by said source of direct current, whereby said electron tube oscillator delivers oscillations of substantially constant frequency and amplitude.

14. In a radio transmitting system, an electron tube oscillator, an alternating current generator connected for energizing the cathodes of said electron tube generator, a source of direct current for exciting the field of said alternating current generator, and a piezo electric crystal connected with said electron tube oscillator for controlling the frequency thereof, the anode electrodes of said electron tube oscillator being energized by said source of direct current, whereby said electron tube oscillator delivers oscillations of substantially constant frequency and amplitude.

LAWRENCE A. HYLAND.